(12) United States Patent
Jonsson et al.

(10) Patent No.: US 11,079,173 B2
(45) Date of Patent: Aug. 3, 2021

(54) CONTROL SYSTEM FOR AUTOMATIC CONTROLLING REEFER CONTAINER RESOURCES

(71) Applicant: MAERSK LINE A/S, Copenhagen K (DK)

(72) Inventors: Ragnar Ingi Jonsson, Copenhagen (DK); Rabia Line Bonding Granlund, Valby (DK); Rasmus Solmer Eriksen, Copenhagen (DK); Thierry Seurin, Copenhagen (DK); Morten Rene Baerrentz, Copenhagen (DK)

(73) Assignee: MAERSK LINE A/S, Copenhagen K (DK)

( * ) Notice: Subject to any disclaimer, the term of this patent is extended or adjusted under 35 U.S.C. 154(b) by 285 days.

(21) Appl. No.: 15/555,249

(22) PCT Filed: Mar. 4, 2016

(86) PCT No.: PCT/EP2016/054717
§ 371 (c)(1),
(2) Date: Sep. 1, 2017

(87) PCT Pub. No.: WO2016/139364
PCT Pub. Date: Sep. 9, 2016

(65) Prior Publication Data
US 2018/0347895 A1   Dec. 6, 2018

(30) Foreign Application Priority Data

Mar. 4, 2015   (DK) ............................. PA201500136

(51) Int. Cl.
*F25D 29/00*   (2006.01)
*G06Q 10/08*   (2012.01)
*G05B 19/042*  (2006.01)

(52) U.S. Cl.
CPC ......... *F25D 29/003* (2013.01); *F25D 29/008* (2013.01); *G05B 19/042* (2013.01);
(Continued)

(58) Field of Classification Search
None
See application file for complete search history.

(56) References Cited

U.S. PATENT DOCUMENTS 5,579,648 A * 12/1996 Hanson ................ B60H 1/3225
62/126
2006/0008587 A1   1/2006 Suzuki et al.
(Continued)

FOREIGN PATENT DOCUMENTS

CN   101021724 A   8/2007
CN   103558496 A   2/2014
(Continued)

*Primary Examiner* — Ziaul Karim
(74) *Attorney, Agent, or Firm* — EIP US LLP

(57) ABSTRACT

A control system automates control of reefer container resources in a reefer container system including a remote server computer in communication with reefer containers. Each reefer container includes a refrigeration system to control a climate of an interior cargo compartment of the reefer container. The refrigeration system includes a refrigeration circuit, including a compressor, a cooling space, and sensors to measure or estimate refrigeration system readings. The refrigeration system transmits refrigeration system parameter data; the remote server computer obtains the parameter data acquired during operation of the refrigeration system from at least one reefer container, and estimates a condition of the refrigeration system, including determining whether an alarm has been issued, or whether the estimated reefer container condition indicates that the refrigeration system requires maintenance or testing. A reefer container resource control unit receives the reefer container condition
(Continued)

to automatically allocate the reefer container based on the reefer container condition.

30 Claims, 7 Drawing Sheets

(52) U.S. Cl.
CPC ..... G06Q 10/0832 (2013.01); G06Q 10/0838 (2013.01); *F25D 2700/12* (2013.01); *G05B 2219/2654* (2013.01)

(56) References Cited

U.S. PATENT DOCUMENTS

| | | | |
|---|---|---|---|
| 2008/0270076 A1* | 10/2008 | Breed | B60R 21/01538 702/185 |
| 2011/0221573 A1* | 9/2011 | Huat | G06Q 10/00 340/10.1 |
| 2013/0036068 A1* | 2/2013 | Smith | G06Q 10/083 705/332 |
| 2013/0100609 A1 | 4/2013 | Wang et al. | |
| 2013/0138251 A1 | 5/2013 | Thogersen et al. | |
| 2013/0289927 A1 | 10/2013 | Smith et al. | |
| 2014/0157809 A1* | 6/2014 | Crombie | F25D 29/00 62/129 |
| 2014/0180953 A1* | 6/2014 | Westcott | A23B 7/152 705/332 |

FOREIGN PATENT DOCUMENTS

| | | |
|---|---|---|
| CN | 104053613 A | 9/2014 |
| JP | 2005-172395 A | 6/2005 |
| JP | 2005-172396 A | 6/2005 |
| WO | 2006/093744 A2 | 9/2006 |
| WO | 2013/077992 A1 | 5/2013 |

* cited by examiner

CONTROL SYSTEM FOR AUTOMATIC CONTROLLING REEFER CONTAINER RESOURCES

TECHNICAL FIELD

The present invention relates to a method and a system for management of reefer containers, more specifically, the present invention relates to a method of and a system for controlling reefer container resources in a reefer container system comprising a remote server computer and a plurality of reefer containers wherein the remote server computer is configured to communicate with the plurality of reefer containers.

BACKGROUND

Remote monitoring of cargo shipping reefer containers is a relatively new technical field. In connection with remote monitoring, cargo shipping reefer containers are configured with a refrigeration system that has installed therewith a control computer coupled with sensors monitoring the operation of the refrigeration system. Cargo shipping reefer containers typically conform to the ISO standard and are also denoted reefer ISO-containers.

Classic ISO containers typically are 8 ft 6 inches high whereas reefer containers typically are "high cube" containers having a height of 9 ft 6 inches An ISO-container is an article of standardized transport equipment which is very widely used in commercial transport. Typically, ISO-containers have lengths of 20, 40 or 45 feet and have standard fittings that can be used for attachment to vehicles and for stacking on-board carriers. Most ISO-containers have a unique combination of letters/numbers that enable unique identification thereof.

Many of the containers are reefer containers that are provided with a refrigeration system or a climate regulating system configured for keeping the cargo at a set temperature and/or humidity—often within quite narrow tolerances. For instance, a 40 ft container is usually constructed with a 38 ft cargo space and a 2 ft refrigeration apparatus.

Today, more than about 90% of international cargo is transported in containers. The containers carry cargo literally all over the world, from the southernmost regions to the northernmost regions and vice versa. A large part of that cargo is in the form of foodstuffs that are transported for many days from one part of the world to another. The qualities of the foodstuffs that arrive at their destination following transport in containers depend to a very high degree on the efficiency and performance of the refrigeration or climate regulating system. If a refrigeration system or a climate regulation system breaks down during transport of the cargo, the cargo will usually be ruined when it arrives at its destination.

Typically, the cargo is transported over large distances and therefore also exposed to very different ambient climates. The refrigeration container and the refrigeration or climate regulating systems thus need to function reliable in climates which may vary significantly in the course of a single transport. For instance, the container may be subject to widely varying ambient temperatures and widely differing humidity levels, while the interior climate of the container should remain under substantially same conditions. This may stress a refrigeration or climate regulation system significantly.

It is known to provide monitoring systems in reefer containers, as shown in e.g. US2008/0270076, by incorporating a diagnostic module into the container, for diagnosing the operating part. When an abnormal operation is determined a signal indicating the abnormal operation may be transmitted to a remote facility. It is also known to store information collected during a trip and read the data by e.g. a facility manager, when the container arrives at a destination.

It is also known, from e.g. US 2013/0289927, to measure environmental parameters, such as an environmental temperature, and to transmit such measurements to a server computer to ensure that cold chain integrity is maintained, and to provide an alarm if cold chain integrity is not maintained.

In order to ensure that the container and the refrigeration or climate control system functions reliable, a reefer container is typically evaluated in between trips. Typically, a state of the refrigeration system or of the climate regulation system is evaluated by performing tests on the empty container at the terminal, thus, on the un-loaded container in a stable environment.

The presence of an alarm or the monitoring of environmental parameters does not provide sufficient information regarding the condition or the reliability of a refrigeration or climate control system. Typically, the presence of an alarm indicates that the reefer container and/or the refrigeration or climate control system should be controlled and/or repaired as soon as possible and particularly before a new shipment.

SUMMARY

It is an object of the present invention to provide a method and a system overcoming at least some of the disadvantages as set out above.

It is a further object of the present invention to provide information on the state or condition of a refrigeration or climate control system.

According to the present invention, at least some of the above and other objects are fulfilled by providing a method and a system for reefer control. A method of controlling reefer container resources in a reefer container system comprising a remote server computer in communication with a plurality of reefer containers is provided. Each reefer container comprises a refrigeration system configured to control a climate of an interior cargo compartment of the reefer container and the remote server computer is configured to communicate with the plurality of reefer containers. The method comprises, at the remote server computer, obtaining refrigeration system parameter data, such as refrigeration system parameter data which may be acquired during operation of the refrigeration system, from at least one reefer container via a communication unit, and analysing the refrigeration system parameter data to estimate a reefer container condition.

Each reefer container may be subjected to release requirements including physical pre-trip inspection and the condition of the reefer container may comprise a physical pre-trip inspection determination. The release requirement may furthermore include a visual pre-trip inspection. Typically, the visual pre-trip inspection may be made even when it is decided that because the physical pre-trip inspection determination is positive, a physical pre-trip inspection can be omitted. The release requirement may include further inspections before a container is released, as decided by an operator or facility manager.

The reefer container condition, such as the reefer container condition including the physical pre-trip inspection determination, may be provided to a reefer container resource control unit configured to allocate, such as to book or to send to a test or repair facility, the reefer container based on the reefer container condition.

In some embodiments, if the physical pre-trip inspection determination is negative, the physical pre-trip inspection must be performed, whereas if the physical pre-trip inspection determination is positive, the positive determination may replace the physical pre-trip inspection.

The physical pre-trip inspection determination is negative if an alarm has been issued, or if the estimated reefer container condition of the refrigeration system indicates that the refrigeration system requires maintenance or further testing.

It is an advantage of the present invention that the reefer container condition may be estimated at a remote server computer based on refrigeration system parameter data obtained during operation of the system. By the present invention, it is possible to acquire sufficient refrigeration system parameter data remotely from the reefer container, to thereby not be limited by the computer processing resources located at or in the reefer container itself. When transporting goods in reefer containers, power consumption should be reduced as much as possible, as the power sources are limited. Thus, by being able to estimate the condition of a reefer container, such as the condition of a reefer container refrigeration system, at a remote server computer, allows for more complex computations than should the diagnostics be performed at or in the reefer container itself. Typically, diagnostics have been performed at the site of the reefer container, such as by a diagnostic unit at the reefer container, with only alarms being sent to a remote server computer. This has been the case as also the sending of more parameter data via a reefer container communication unit requires both electrical power and processing power. It has however been found by the present inventors that even by the limited amount of refrigeration system parameter data which may be obtained remotely from the reefer container, the reefer container condition may be estimated.

In one or more embodiments, the reefer container condition may be reset if the reefer container resource control unit intends to book the reefer container for a new trip.

The remote server computer may be configured to communicate with a plurality of reefer containers and to obtain refrigeration system parameter data from at least one, such as from at least two, such as from each of the plurality of reefer containers.

The communication between the remote server computer and the plurality of reefer containers may be a two-way communication or a one-way communication. The communication with the plurality of reefer containers may be a one-way communication so that the remote server computer may receive refrigeration system parameters, however, typically, the remote server computer may not be able to transmit any information, i.e. any commands, data and/or requests back to the reefer container, and thus not be able to send any commands, data and/or requests to a refrigeration system control unit. In one-way communication, typically, only the refrigeration system control unit will be able to transmit information. The server communication unit configured for communicating with the reefer container may comprise a receiver only, and no transmitter.

It is an advantage of having a remote server computer being configured to communicate with a plurality of reefer containers and to obtain refrigeration system parameter data from at least one of the reefer containers that the parameters may be analysed at the remote server computer. Hereby, the condition of the refrigeration system may be estimated, and conditions which indicate that the refrigeration system requires maintenance or further testing may be detected, even when the conditions as such do not result in alarms, such a reefer container alarms, being issued.

It is a further advantage of providing the condition of the refrigeration system to a reefer container resource control unit that the resources of the reefer container network may be determined based on the reefer container condition.

In one or more embodiments, the reefer container condition may comprise information about the condition of the loaded reefer container. It is an advantage of providing a condition on a loaded reefer container in that a standard test performed at the terminal on an empty container, inherently is performed on an unloaded system. Even though the test may simulate a loaded state, it may be unable to test for faults occurring only when the refrigeration system is loaded.

The physical Pre-Trip-Inspection, PTI, is typically a spot check and does not take into account how the reefer container has performed during the last booking or last trip. Similarly, a PTI is performed in stable climate conditions having a stable ambient temperature which does not stress the system as a trip through different climate zones. Furthermore, for example a low ambient temp at the PTI premises will make the PTI easier to pass, and thus some defects may remain undetected. This means that the physical PTI has flaws. Thus, the condition of the reefer container as estimated by the present method may provide a more correct estimate of the reefer container, than a physical PTI.

In some embodiments the step of analysing the refrigeration system parameter data to estimate a reefer container condition is triggered by one or more reefer container events. Thus, the method may be performed automatically or semi-automatically in dependence of specific reefer container events. Alternatively, the method may be performed manually, so that an operator may trigger the analysis of the obtained refrigeration system parameter data.

The refrigeration system parameter data may comprise a plurality of refrigeration system parameter data acquired at a plurality of time instances during operation of the refrigeration system. The plurality of refrigeration system parameter data may for example comprise at least first parameter data acquired at a first time and second parameter data acquired at a second time during operation of the refrigeration system, etc. The first parameter data may comprise parameter data which are not controllable by the refrigeration system control unit, such as for example ambient air temperature, set-point values, ventilation values, such as fresh air ventilation, etc. The second parameter data may comprise parameter data which values are affected by the performance of the refrigeration system. Thus, the second parameter data may be refrigeration system parameter data and may comprise supply air temperature; return air temperature; refrigerant suction pressure; refrigerant discharge pressure; interior cargo compartment humidity; condenser temperature; refrigerant temperature, such as discharge temperature, suction temperature; etc.

The refrigeration system parameter data may comprise a plurality of refrigeration system parameter data acquired at a plurality of time instances during operation of the refrigeration system. Hereby, the condition of the refrigeration system may be determined based on refrigeration system parameter data acquired at different time instances, and thereby, the analysis may comprise analysis of time-varying trends in the refrigeration system parameter data when determining the condition of the refrigeration system.

Typically, refrigeration system parameter data acquired at different time instances will be marked with a time stamp indicating the time at which the refrigeration system parameters were actually measured. The refrigeration system parameter data acquired at different time instances may be obtained by the remote server computer when they are made available or the remote server computer may obtain a number of refrigeration system parameter data acquired at different time instances at any one time.

The refrigeration system parameter data may be obtained by the remote server computer at regular or semi-regular intervals e.g. every 20 minutes, every 30 minutes or every hour or at any other intervals. The refrigeration system parameter data may be provided as data packets, each data packet having a time stamp and comprising refrigeration system parameter data acquired at the specific time instance indicated by the time stamp.

In one or more embodiments, the plurality of time instances may be distributed over a period of time. The period of time may be 24 hours, 48 hours, 1 week, 2 weeks, 3 weeks, 1 month, 2 months, 3 months, etc. The period of time typically being dependent on the loaded reefer container transport time. Thus, the period of time may be at least 20% of a loaded reefer container transport time, such as at least 30%, such as at least 40%, such as at least 50%, such as at least 75%, such as at least 90% of a loaded reefer container transport time.

In one or more embodiments, the reefer container is an intermodal reefer container, the intermodal reefer container being transported during operation, such as on a container vessel, while the remoter server computer is provided remotely from the intermodal reefer container, and thus remotely from the container vessel, at predetermined location.

In one or more embodiments the refrigeration system parameter data are acquired during operation of the refrigeration system of at least one loaded reefer container. Thus, the refrigeration system parameter data may be measured or estimated at the refrigeration system when the reefer container is loaded with cargo, such as with temperature sensitive cargo.

The refrigeration system parameter data may comprise one or more measurement or estimate or indicator values obtained or derived from sensors of the refrigeration system. For example, the refrigeration system parameter data may comprise refrigeration system readings including ambient air temperature; supply air temperature; return air temperature; refrigerant suction pressure; refrigerant discharge pressure; set-point values, such as temperature set-point, humidity set point; fresh air ventilation values; expansion valve opening or position; humidity; condenser temperature; refrigerant temperature, such as discharge temperature, suction temperature; refrigeration system status, such as condenser fan status, economizer valve status, evaporation fan speed status; current in different phases; suction modulation valve opening, etc. The refrigeration system status may include actuation values or actuation states. These parameter values may be measured or estimated by sensors included with the refrigeration system for acquiring these parameter data. The sensors may include temperature sensors and pressure sensors, such as differential pressure sensors, etc., and may be positioned so as to measure or estimate the corresponding parameter values and provide the acquired refrigeration system parameter data to a refrigeration system control unit. Typically, the pressure is the pressure of the refrigerant.

In one or more embodiments, the refrigeration system parameter data are provided to a refrigeration system control unit, which is connected to a reefer container communication unit, which in turn may communicate with the server communication unit.

In some embodiments a further communication unit is installed at a location where multiple containers are temporarily stowed e.g. on a container vessel and the refrigeration system control units of each reefer container may be in in communication with the further communication unit e.g. via a wired or wireless network. Either the further communication unit and/or the reefer container communication unit may comprise a modem, an RCD, etc. which may communicate directly or via a further server provider with the server communication unit.

Typically, communication between reefer container communication units and further communication units installed on e.g. a container vessel, is facilitated using a short range network, such as via a local area network, a Bluetooth network, a local telecommunication network, such as a local GSM network, a local ZigBee network, or any other communication standard configured to facilitate short range communication. The further communication unit and/or the reefer container communication unit may be configured for communication with a remote communication unit, such as via a long-range communication standard. The further communication unit and/or the reefer container communication unit may comprise a modem, such as an RCD, and may be configured to communicate with a centrally positioned server, such as a communication unit at the remote server computer, either directly or via a routing communication unit, such as a third party communication unit. The further communication unit and/or the reefer container unit may be configured to communicate via a long range communication standard, such as via satellites, such as via a satellite link or via a GSM or any other tele-communication network. The communication unit may thus operate in principle as a relay station forwarding the data it receives.

In some embodiments, only a limited set of parameter data are obtained. The limited set of parameter data may comprise only a limited number of available parameter data, such as 4, 5, 6, 7 or 8 parameter data. The limited set of parameter data may comprise any limited number of the following: ambient temperature, return air temperature, supply air temperature, set point temperature, refrigerant discharge pressure and refrigerant suction pressure, and possibly additional parameter data up to the limited number of available data. In some embodiments, data may only be provided at discrete time instances at selected time intervals. For example, data may be provided for one second each hour, each 20 min, each 40 min, etc.

It is an advantage of the present invention that a condition of the reefer container may be determined also with a limited set of parameter data.

The reefer container condition may be provided to a reefer container resource control unit configured to allocate the reefer container based on the reefer container condition. The allocation may comprise booking the container for a new trip. Typically, the allocation comprising booking the container for a new trip may be performed if the physical pre-trip inspection determination is positive, so that the positive physical pre-trip inspection determination, and thus the estimated reefer container condition, replaces the physical pre-trip inspection.

This may for example be effectuated by sending the reefer container to a loading area of a terminal or port area, or possibly to an area for visual inspection of the reefer container. The allocation may comprise scheduling a test or repair for the reefer container, and this may for example be effectuated by sending the reefer container to a test or repair facility, etc. Thus, in dependence on the reefer container condition, the reefer container resource control unit may direct the reefer container to an intended next location.

In one or more embodiments, the remote server computer may obtain one or more alarms if a fault at the refrigeration system is detected. The refrigeration system control unit may issue the alarm and provide the alarm to the remote server computer, via the communication units as discussed above. Typically, an alarm is issued when a fault as such is detected at the refrigeration system.

In one or more embodiments, the remote server computer furthermore receives reefer booking information. The reefer booking information may comprise cargo type information, cargo weight and/or cargo properties, the cargo properties including cargo thermo-dynamic properties, or estimated values thereof. The cargo properties may comprise cargo transport temperature, cargo weight, cargo respiration heat, cargo respiratory heat production and/or cargo heat capacity.

In some embodiments the remote server computer may obtain reefer booking information and the step of analysing the refrigeration system parameter data to estimate the reefer container condition may include analysing the reefer booking information and the refrigeration system parameter data to estimate a reefer container condition.

In some embodiments the cargo thermo-dynamic properties, or estimated values thereof, are stored in a storage accessible to the server computer, such as in a server computer storage, or in a database storage accessible to the server computer. The thermo-dynamic properties, or estimated values thereof, corresponding to the cargo type information obtained with the reefer booking information may then be obtained by the server computer from the storage.

The step of analysing the refrigeration system parameter data to estimate a reefer container condition may thus comprise analysing the reefer booking information, the retrieved thermo-dynamic properties, or estimated values thereof, and the refrigeration system parameter data to estimate a reefer container condition.

The cargo type information may be provided in the form of cargo commodity codes.

Typically, total or system respiratory heat production and system heat capacity for the specific cargo contained in the reefer container is determined based on a temperature set-point as provided with the refrigeration system parameter data and the thermo-dynamic properties of the cargo, such as estimated values of the thermo-dynamic properties. Hereby, the correct set of thermo-dynamic properties, i.e. relating to frozen or non-frozen cargo, may be obtained by the server computer.

Thus, the step of analysing the refrigeration system parameter data to estimate the reefer container condition may include analysing the reefer booking information and the refrigeration system parameter data to determined or estimate a total or system respiratory heat production and system or total heat capacity for the specific cargo.

In one or more embodiments, the remote server computer may furthermore receive historic reefer condition information, such as time for last physical pre-trip inspection, previous conditions of the reefer container, etc.

Thus, the step of analysing to determine the condition of the reefer container, may comprise analysing the refrigeration system parameter data together with the one or more alarms, the reefer booking information and/or historic reefer condition information.

Hereby, the condition of the reefer container may be evaluated not only based on refrigeration system parameter data, but also based on the cargo as loaded in the reefer container and the cargo properties. Hereby, a more detailed evaluation of the refrigeration system may be obtained as the properties of the cargo influences both the refrigeration system parameter data themselves, and the way the refrigeration system parameter data should be interpreted and analysed. It is also an advantage of including any alarms issued by the refrigeration system control unit, as this provide further information of the state of the refrigeration system.

As an example, when cargo is loaded into the container, information about the cargo, may provide additional information of which temperature transients or temperature oscillations may be expected in the beginning of the trip, particular if the cargo loaded has a higher temperature than a pre-set temperature, i.e. typically during a temperature "pull down" when the cargo is loaded. For example, bananas are often being loaded "warm", that is at a temperature higher than the preferred transport temperature or the set-point temperature for the transport. Thus, what is expected is a pull-down in temperature. By knowing both the cargo type, that is bananas, and the set-point temperature, typically around 13 degrees, the total or system respiratory heat production and system heat capacity for the specific load of bananas may be determined. Based on these calculations, a simulated or expected "pull-down" is expected, such as an expected temperature change curve in the beginning of the trip. Should the system have a different temperature change curve than the expected curve, such as a transient or a cool down time which is longer than the expected pull down, this could indicate a number of preliminary weaknesses in the machinery e.g. missing refrigerant, etc. However these may only be preliminary and thus not sufficient to otherwise raise an alarm. In such a case, before the reefer container may be approved for the next journey, the cause for the slow reduction of the temperature needs to be found, typically by performing a physical pre-trip inspection, i.e. by inspection of the reefer container by technicians and by running a self-diagnostic algorithm as is typically implemented in the reefer unit by the reefer manufacturer.

In the above example, the additional information regarding the cargo as obtained from the reefer booking system, provides additional information, and thus an additional exactness to the analysis and/or the simulation model.

In one or more embodiments, the method may comprise evaluating the refrigeration system parameter data as received at the remote server computer and incrementing a certainty indicator based on the evaluation of the refrigeration system parameter data.

The evaluation of the refrigeration system parameter data may comprise estimating a load of the refrigeration system at the time of data acquisition, and incrementing the certainty indicator with the estimated load of the refrigeration system.

In one or more embodiments, the determined condition of the reefer container is a trusted condition if the certainty indicator is above a predetermined threshold.

Alternatively, or additionally, the determined condition of the reefer container may be a trusted condition if one or more, such as at least specified number of refrigeration system parameter data have been obtained during an estimated significant load of the refrigeration system, such as at an estimated load of above 50% of a maximum load, such as above 80% of a maximum load of the refrigeration system.

In one or more embodiments, the method may comprise evaluating the refrigeration system parameter data and reefer booking information and/or cargo thermo-dynamic properties, or estimated values thereof, and incrementing a certainty indicator based on the evaluation of the refrigeration system parameter data and the reefer booking information and/or cargo thermo-dynamic properties, or estimated values thereof.

Hereby, it is ensured that the refrigeration system has been loaded to a certain threshold before the analysis of refrigeration system parameter data and/or further information as discussed above, is considered to be able to provide an indication of the actual state of the refrigeration system. If the refrigeration system has not been loaded, i.e. if the ambient temperature corresponds e.g. within a margin of +/−5 degrees to a desired temperature of the cargo, the refrigeration system will be in a continuous state of controlling the refrigeration system with only a low load, such as a load of below 25% of maximum loading, such as below 10% of maximum loading of the refrigeration system.

In one or more embodiments, an alarm may be issued while the certainty indicator is below a predetermined threshold, or while the specified number of refrigeration system parameter data having been obtained during an estimated significant load of the refrigeration system, has not been reached.

The analysis is typically performed in dependence of specific reefer container events, and the analysis may thus be triggering at the specific reefer container events, and for example, the analysis may be triggered when the reefer container changes status to for example DISCHARGED or, GATE-OUT.

At the status DISCHARGE, the reefer container is discharged from the container vessel, freight train, etc., and enters a terminal or a yard. As the status changes to GATE-OUT, the loaded container is exiting the terminal to be unloaded e.g. at the final destination.

At these instances, the analysis may be triggered and a condition of the reefer container determined.

The condition of the reefer container may comprise an indication of the state of the refrigeration system of the reefer container, and may include a determination of whether a physical pre-trip inspection is required for the reefer container or whether a visual pre-trip inspection is sufficient.

The condition is provided to the reefer container resource control unit to allocate the reefer container based on the reefer container condition. Thus, if the condition of the reefer container indicates that a physical pre-trip inspection is required, the reefer container resource control unit may schedule such a physical pre-trip inspection for when the reefer container is expected to be delivered back to the terminal, i.e. when the status of the reefer container is expected to change to GATE-IN, where the empty reefer container is delivered to the terminal. Likewise, if the condition of the reefer container indicates that no physical pre-trip inspection is necessary, the container resource control unit may be scheduled for bookings at the expected time for GATE-IN, as only a visual pre-trip inspection may be needed.

Typically, if one or more alarms are issued, a physical pre-trip inspection for the reefer container is scheduled.

Conventionally, physical pre-trip inspections have been carried out at all reefer containers, before each new booking of the reefer container, and thus before each new loaded trip of the reefer container. Thus, each reefer container is typically subjected to release requirements including the physical pre-trip inspection, and typically also a visual inspection.

Such tests are costly and substantial energy is consumed in connection with conventional pre-trip inspections (PTIs). Conventional pre-trip inspections involve an up to 7 hours long test-run of the reefer container to test that its refrigeration system and refrigeration system control unit operates according to any specifications provided. The physical pre-trip inspection requires manpower to initiate the inspection and to monitor the outcome of the inspection. During such physical pre-trip inspections, the refrigeration system is exposed to a so-called stress-test where maximum cooling and maximum heating is performed.

The physical pre-trip inspection is a very energy consuming exercise. Thus, by being able to estimate a condition of the reefer container, the amount of physical pre-trip inspections may be significantly reduced.

It is thus an advantage that a positive physical pre-trip inspection determination may replace the physical pre-trip inspection. By being able to not only skip any physical pre-trip inspections but also to provide the condition to a reefer container resource control unit, the downtime for physical pre-trip inspection can be planned at an early stage, and likewise, downtime for the reefer container can be reduced by being able to for example already at the stage of DISCHARGE be able to allocate the reefer container for a further booking when, or shortly after, the reefer container is expected to be received from a client, e.g. at the expected time for GATE-IN.

In one or more embodiments, the reefer container condition may be reset if the reefer container resource control unit intends to book or schedule the reefer container for a new trip. Thus, if the reefer container condition indicates, at the end of a trip, for example at GATE IN, that no further testing of the reefer container is necessary, i.e. the reefer container condition is positive, the reefer container condition is reset. Likewise, the reefer container condition may be reset after completion of a physical pre-trip inspection. The reefer container condition may be reset at any event specified as indicating an end of trip, and thus the reefer container condition may also be reset at DISCHARGE or GATE OUT.

In one or more embodiments, the step of analysing to determine the condition of the reefer container includes issuing an alarm if the determined condition of the reefer container is negative, i.e. if a physical pre-trip inspection is needed.

DISCHARGE being the unloading of the reefer container from the vessel, GATE OUT being the reefer container being delivered from the terminal to a final destination for the reefer container, GATE IN being the empty container entering the terminal, or the terminal area.

It should be envisaged that the refrigeration system parameter data may be measured at the refrigeration system during a booked trip and that the refrigeration system parameter data may be measured while cargo is provided in the cargo compartment.

In one or more embodiments, the method may comprise obtaining first set of parameter data and a second set of parameter data acquired during operation of the refrigeration system, and the analysis of the refrigeration system parameter data may comprise processing the first set of parameter data to provide simulated parameter data, the simulated parameter data being estimates of the second set of parameter data. Typically, the first set of parameter data comprises parameter data from a selected first group of parameters, and the second set of parameter data comprises parameter data from a selected second group of parameters, the parameters in the first group being different from the parameters in the second group. The first group of parameters may comprise parameters which are not controllable by the refrigeration system control unit, such as for example ambient air temperature, set-point values, ventilation values, such as fresh air ventilation, etc. The second group of parameters may comprise parameters which values are affected by the performance of the refrigeration system. Residual values may be computed as the difference between the second parameter data and the simulated parameter data, and an indicator value as a function of the residual values may be computed. The step of analysing may comprise evaluating the indicator value to estimate a reefer container condition.

The second group of parameters may comprise supply air temperature; return air temperature; refrigerant suction pressure; refrigerant discharge pressure; interior cargo compartment humidity; condenser temperature; refrigerant temperature, such as discharge temperature, suction temperature; etc.

Typically, the first set of parameter data and the second set of parameter data are acquired at a same time instance.

In some embodiments, the method may comprise obtaining first set of parameter data and a second set of parameter data acquired during operation of the refrigeration system, and furthermore obtaining reefer booking information and/or cargo thermo-dynamic properties, or estimated values thereof, the analysis may comprise analysis of both the refrigeration system parameter data and the reefer booking information and/or cargo thermo-dynamic properties, or estimated values thereof, processing the first set of parameter data based on this analysis to provide simulated parameter data, the simulated parameter data being estimates of the second set of parameter data.

It is a further advantage that by including the reefer booking information and/or cargo thermo-dynamic properties, or estimated values thereof, the simulated parameter data may be more precise estimates of the second set of parameter data.

It is an advantage of including the reefer booking information and/or cargo thermo-dynamic properties, or estimated values thereof in the decision on whether to increase the certainty indicator. As the simulation gets more precise, the difference between the simulation and the measurements may be expected to be more stable, thus, the certainty indicator may start increasing earlier in the trip.

According to a further aspect of the present invention, a system for controlling reefer container resources comprising a plurality of reefer containers is provided. The system comprises a plurality of reefer containers, each reefer container comprising a refrigeration system configured to control a climate of an interior cargo compartment of the reefer container, a refrigeration system controller configured to provide refrigeration system parameter data, a communication unit configured to communicate with a remote server computer, the remote server computer being configured to obtain the refrigeration system parameter data as acquired during operation of the refrigeration system from at least one reefer containers via a server communication unit. The refrigeration system parameter data may be analysed to estimate a condition of the refrigeration system and the reefer container condition, such as the reefer container condition including the physical pre-trip inspection determination, may be provided to a reefer container resource control unit, such as to allocate the reefer container based on the reefer container condition.

Each reefer container may be subjected to release requirements including physical pre-trip inspection and the condition of the reefer container may comprise a physical pre-trip inspection determination.

BRIEF DESCRIPTION OF THE DRAWING

Various embodiments are described hereinafter with reference to the figures. It should be noted that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

DETAILED DESCRIPTION OF THE DRAWING

The term "reefer" denotes, throughout this specification, a refrigerated cargo container. The container may be insulated and provided with means for controlling the climate of the cargo compartment defined by the container. The climate of the cargo compartment may be adaptively or actively controlled, in that a feedback of the conditions in the interior cargo compartment and/or ambient climate is provided to a refrigeration system control unit configured to control the refrigeration system.

Figure 1:
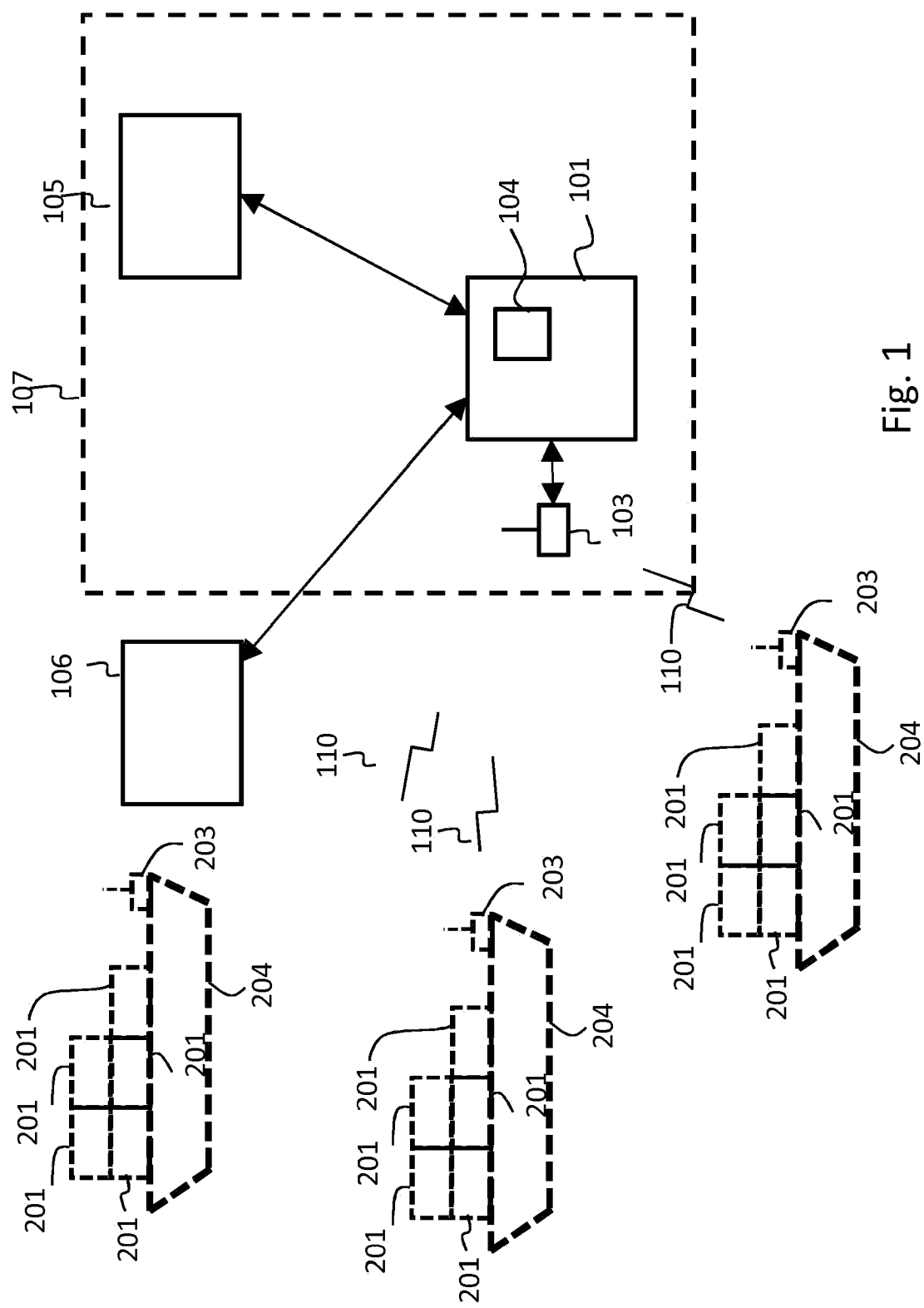
FIG. 1 shows a system for management of reefer containers.

FIG. 1 shows a system for management of reefer containers, more specifically, a system 107 for controlling reefer container resources in a reefer container network. The system comprises a server computer 101, such as a remote server computer, and a plurality of reefer containers 201 wherein the server computer 101 is configured to communicate with the plurality of reefer containers 201 remotely. Thus, the server computer 101 is positioned remotely from the reefer containers 201. Each reefer container is subjected to release requirements including physical pre-trip inspection. The server computer 101 is configured to obtain refrigeration system parameter data as acquired during operation of a refrigeration system of the reefer container 201 from at least one reefer container 201 via a server communication unit 103; and configured to analyse the refrigeration system parameter data, for example in a processing unit 104, to estimate a condition of the reefer container 201, or more specifically, a condition of a refrigeration system 206 of the reefer container, the condition of the reefer container comprising a physical pre-trip inspection determination, and providing the reefer container condition including the physical pre-trip inspection determination to a reefer container resource control unit 105. The reefer container resource control unit 105 may be configured to allocate the reefer container based on the reefer container condition including the physical pre-trip inspection determination. Further information may be stored in a storage, such as in a server computer storage, or in a storage, such as a database storage, accessible by the server computer.

The reefer container resource control unit 105 allocates the reefer container based on the reefer container condition and the physical pre-trip inspection determination, so that if the physical pre-trip inspection determination is negative, the physical pre-trip inspection must be performed, whereas if the physical pre-trip inspection determination is positive, the positive determination replaces the physical pre-trip inspection.

Typically, the physical pre-trip inspection determination is negative if an alarm has been issued, or if the estimated reefer container condition of the refrigeration system indicates that the refrigeration system requires maintenance or further testing.

The server computer comprises a server communication unit 103 being configured to obtain incoming data, and being configured for one- or two-way communication 110 with the reefer containers. Typically, only one-way communication is facilitated.

As seen in FIG. 1, the server computer 101 may receive information from a plurality of reefer containers 201 provided on a plurality of container vessels 204, or other transportation means.

The server computer 101 may furthermore receive reefer booking information. The reefer booking information may comprise cargo type information and/or cargo properties, the cargo properties include cargo thermo-dynamic properties. The cargo properties may comprise cargo transport temperature, cargo weight, cargo respiration heat and/or cargo heat capacity. The reefer booking information may furthermore comprise information about the current transport, and may comprise information about e.g. distance and route for the cargo, and thus also for the reefer container 201.

The reefer booking information may be obtained by the server computer 101 from a reefer booking information unit 106 and the reefer booking information may be analysed in the processing unit 104. The reefer booking information may be included in the analysis of the refrigeration system parameter data, and thus the estimated condition of the reefer container may be based on refrigeration system parameter data and reefer booking information.

The reefer booking information may also comprise historic reefer condition history, and in one or more embodiments, the server computer may furthermore obtain historic reefer condition information, such as time for last physical pre-trip inspection, previous conditions of the reefer container, past bookings, such as past transports or trips, etc. The historic reefer condition history information may be included in the analysis to determine the reefer container condition.

The server computer 101 may also obtain alarms issued by the reefer container 201.

Thus, the step of analysing to determine the condition of the reefer container, may comprise analysing the refrigeration system parameter data together with the one or more alarms, the reefer booking information and/or historic reefer condition information.

Figure 2:
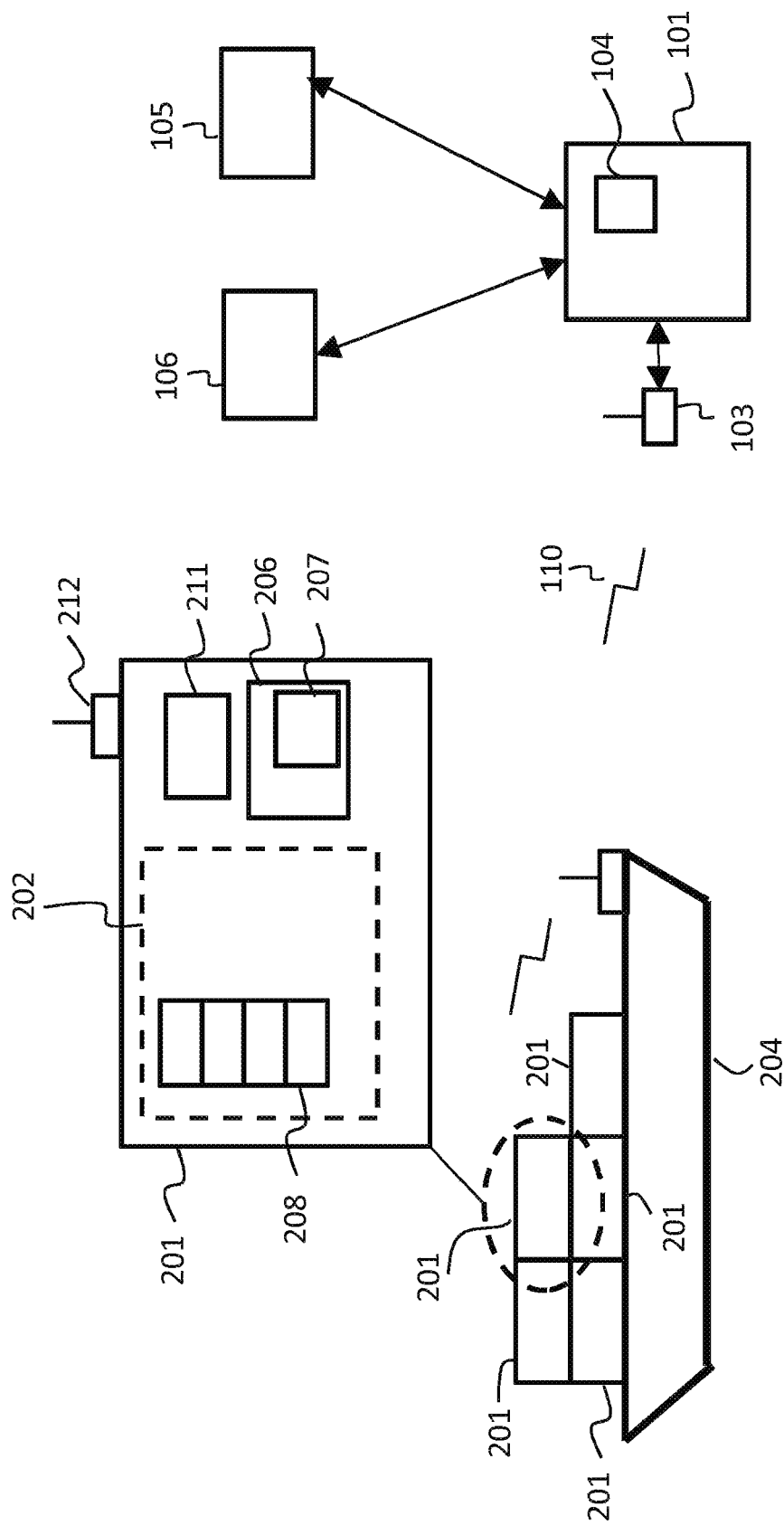
FIG. 2 shows a system for controlling reefer container resources.

FIG. 2 shows the system for controlling reefer container resources including the plurality of reefer containers in more detail.

The system comprises a plurality of reefer containers 201, each reefer container 201 comprising a refrigeration system 206 configured to control a climate of an interior cargo compartment 202 of the reefer container 201 and a refrigeration system controller 211. The refrigeration system comprises a compressor 207 (see more details of the refrigeration system in FIG. 5), and the refrigeration system controller 211 controls the refrigeration system, including the compressor and further refrigeration system elements.

The refrigeration system controller 211 is configured to provide refrigeration system parameter data to the server computer. The reefer container typically comprises a reefer communication unit 212 configured to communicate with the server computer 101 via server communication unit 103. Typically, the reefer communication unit communicates with the server communication unit via local communication unit 203. The local communication unit 203 collects information from reefer containers via reefer communication units 212 within the range of the local communication unit 203, and communicates information from these reefer containers to one or more server computers 103. The server computer 101 is configured to obtain the refrigeration system parameter data as acquired during operation of the refrigeration system 206 from at least one reefer container 201 via a server communication unit 103 and possibly also via communication units 203, 212. The server computer is configured to analyse the refrigeration system parameter data, for example in a processing unit 104, to estimate a condition of the refrigeration system 206 and providing the reefer container condition to a reefer container resource control unit 105.

Typically, during transportation the reefer container is loaded, so that a load or cargo 208 is present in the interior cargo compartment 202.

Figure 3:
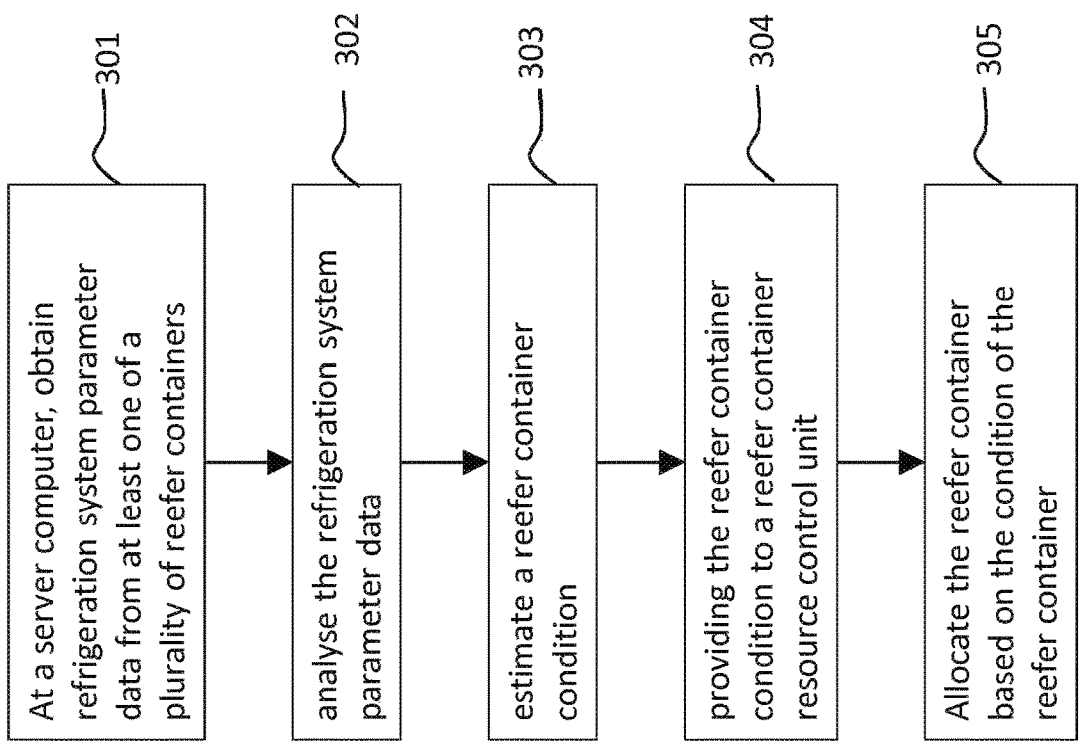
FIG. 3 is a flow chart of a method according to one embodiment of the present invention.

FIG. 3 is a flow chart illustrating a method 300 of controlling reefer container resources in a reefer container system comprising a server computer in communication with a plurality of reefer containers.

In step 301 refrigeration system parameter data acquired during operation of the refrigeration system is obtained from at least one reefer container via a server communication unit. In step 302, the refrigeration system parameter data are analysed, and in step 303, a reefer container condition is estimated based on the analysis as performed in step 302. The reefer container condition is provided to a reefer container resource control unit in step 304, and in step 305, the reefer container is allocated or booked based on the reefer container condition.

Figure 4:
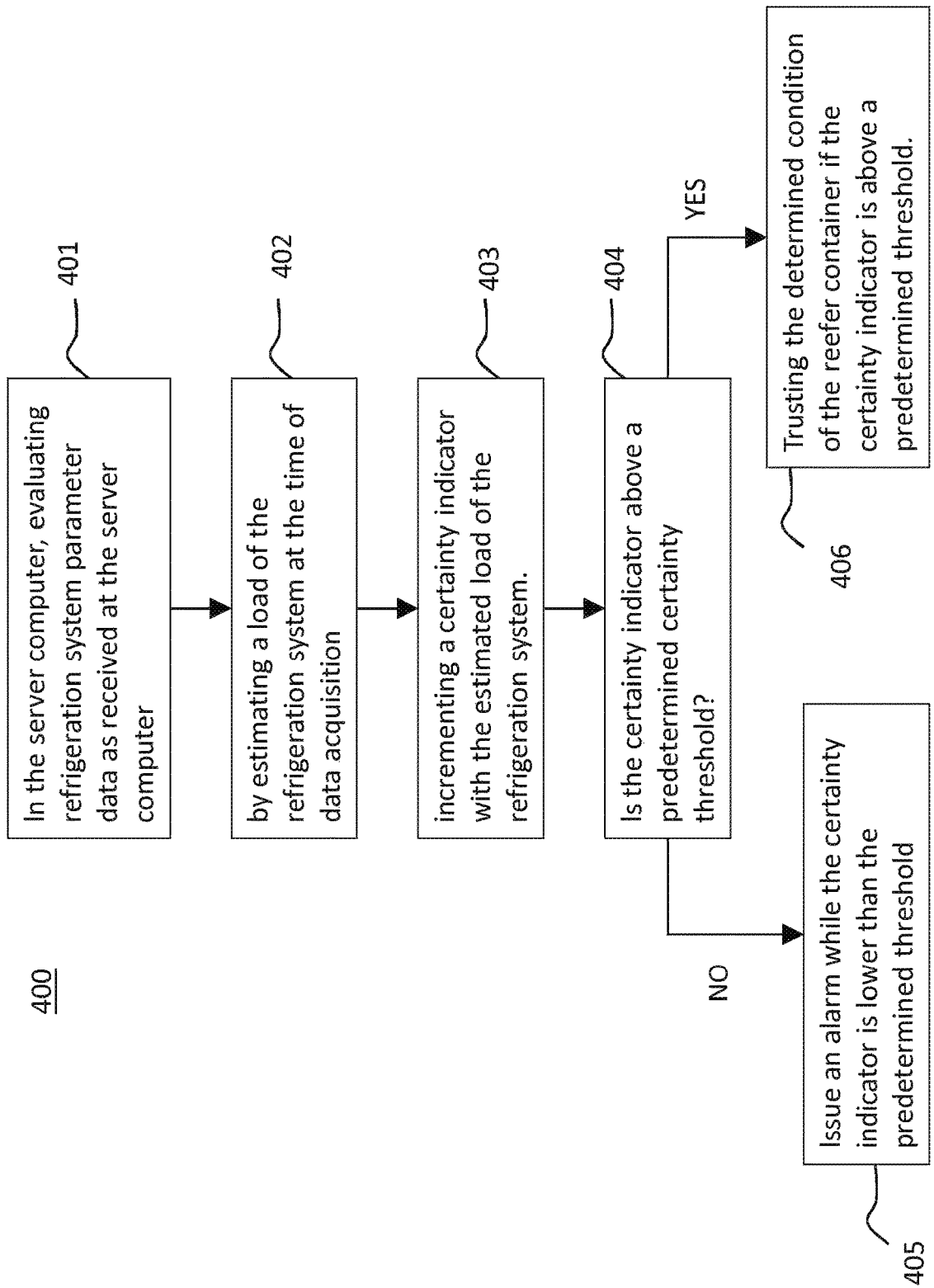
FIG. 4 is a flow chart of a method of according to another embodiment of the present invention.

FIG. 4 is a flow chart of a method 400 of determining whether an estimated condition of the reefer container is reliable and can be trusted.

In step 401, refrigeration system parameter data as received at the server computer are evaluated in the server computer processor 104, for example by evaluating air return temperature, air supply temperature, ambient air temperature, fan speed, etc.

Based on the evaluation, a load of the refrigeration system at the time of data acquisition is estimated in step 402. In step 403, a certainty indicator is incremented with the estimated load of the refrigeration system. It should be noted that if an estimated load is below a certain load threshold, the estimated load may be disregarded and the certainty indicator will not be incremented by a load being below this load threshold.

In step 404, the certainty indicator is compared to a certainty threshold. If the certainty indicator is below the certainty threshold an alarm is issued, in step 405. If the certainty indicator is above the certainty threshold, the determined reefer condition may be trusted in step 406.

Typically, the state of the determined condition of the reefer container, i.e. trusted or not trusted, is provided or input to the server computer in the form of an alarm. Thus, the determination of the state of the determined condition of the reefer container may form part of the step of analysing the refrigeration system parameters to estimate the condition of the reefer container.

The alarm may be active as long as the certainty indicator is below the certainty threshold.

In one or more embodiments, the condition of the reefer container is a condition which can be approved or not approved. If the condition is not approved, a physical pre-trip inspection needs to be scheduled and performed. The condition may comprise reefer container indicators, such as indicators providing more information about specific issues the reefer container may have. If the condition is approved, a physical pre-trip inspection does not need to be scheduled and performed. The approved condition may thus replace the performance of a physical pre-trip inspection. The container may hereby be booked shortly after arrival at the destination, that is shortly after GATE IN.

Figure 5:
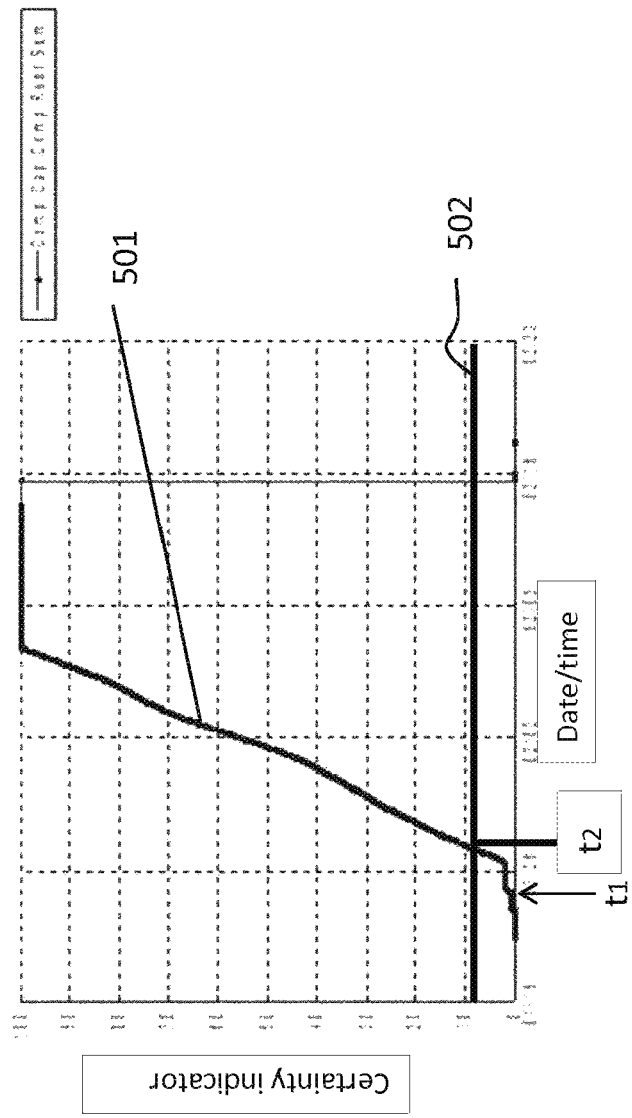
FIG. 5 shows a graph illustrating the certainty indicator.

FIG. 5 shows a plot of the incremented certainty indicator. At time zero, a transient phase is initially present and no load is estimated. At time $t_1$, a normal situation is established and the load of the refrigeration system is estimated, and the certainty indicator is incremented with the estimated load. It is seen that at time $t_2$, the certainty threshold 502 is reached as seen by graph 501. At this point, the certainty alarm will be stopped. The certainty indicator is incremented until either a maximum has been reached or the trip has finished. The certainty indicator is reset for each new booking.

Figure 6:
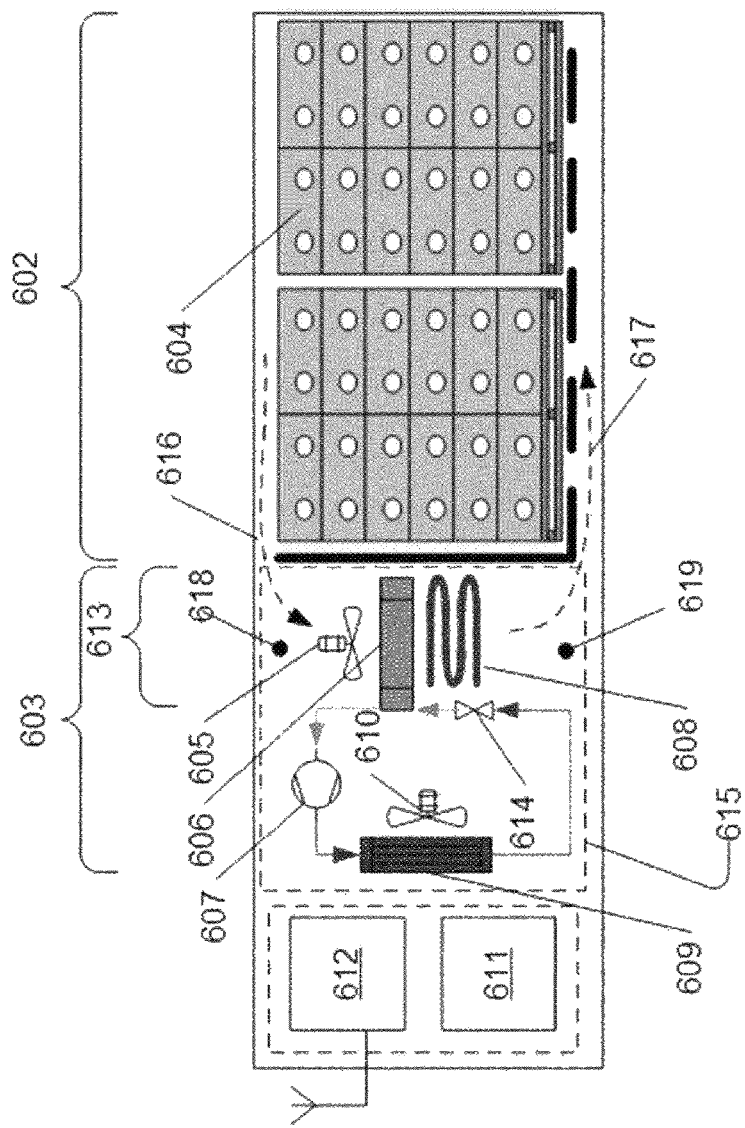
FIG. 6 shows schematically a reefer container with a refrigeration system.

FIG. 6 shows an exemplary cargo shipping reefer container in a simplified and off-scale cross-sectional view. An interior cargo compartment 602 of the refrigerated reefer container 601 comprises, when loaded, a commodity load, for example a commodity load comprising a plurality of stackable transport boxes 604 arranged within the interior cargo compartment 602 such as to leave appropriate clearance at a ceiling and a floor structure for air flow passages above and beneath the commodity load. In this example a so-called vapour compression refrigeration cycle as known in the art is used.

The refrigeration system 603 comprises a refrigeration circuit 615 and a cooling space 613. The refrigeration circuit comprises a compressor 607, a condenser 609, an expansion device 614 and an evaporator 606. The compressor 607 and the condenser 609 are typically situated outside an insulated enclosure of the transport container 601. Usually the condenser 609 is an air-cooled condenser with one or more condenser fans 610 routing air in heat transfer relation with the condenser in order to eject heat from the condenser to its environment. The condenser 609 may also be water-cooled.

The cooling space 613 is situated inside the insulated enclosure of the transport container 601. The cooling space 613 is normally separated from the interior cargo compartment 602 by a panel equipped with one or more openings to allow a return air flow 616 from the interior cargo compartment 602 into the cooling space 613 and a supply air flow 617 out of the cooling space 613 into the interior cargo compartment 602. The air flow through the cooling space is maintained by one or more evaporator fans 605. On its way through the cooling space, air passes a return air temperature sensor 618, the one or more evaporator fans 605, the evaporator 606, a heating unit 608, and a supply air temperature sensor 619.

The heating unit 608 may be any heating unit, such as an electric heater or a reheat air coil. Typically, an electric heater is an electrical resistor and works on the principle of Joule heating, i.e. an electric current through a resistor converts electrical energy into heat. Usually a reheat air coil is a heat exchanger connected to the refrigeration circuit with controllable valves in such a way that hot pressurized refrigerant, exiting the compressor, can be directed through the heat exchanger when heating is demanded.

During the so-called vapour compression refrigeration cycle the compressor 607 sucks refrigerant vapour (at a suction pressure, $P_{suction}$) from the evaporator and compresses the refrigerant vapour which subsequently flows to the condenser at high pressure (at a discharge pressure ($P_{discharge}$)). The condenser ejects its heat to a medium (air or water) outside the refrigerated transport container while condensing the refrigerant vapour. The liquefied refrigerant flows to the expansion device in which a refrigerant pressure drops. The low pressure refrigerant then flows to the evaporator 606 where the refrigerant evaporates while extracting the required heat from the refrigerated transport container.

Although not shown, pressure sensors are installed in the refrigeration system 603 to measure the suction pressure and the discharge pressure.

The refrigeration system 603, including sensors, such as temperature sensors, pressure sensors, etc., valves, fans and circuits of the refrigeration system, communicate with a refrigeration system control unit 611. Refrigeration system parameter data, such as sensor measurements, valve positions, fan settings, etc., may be communicated to the refrigeration system control unit 611, and typically the refrigeration system parameter data are logged by the refrigeration system control unit 611. The refrigeration system parameter data may include any measurements and data provided by the refrigeration system, such as fresh air ventilation, ambient temperature, return air temperature, set point temperature, supply air temperature, humidity, condenser temperature, refrigerant discharge temperature, refrigerant suction temperature, discharge pressure, suction pressure, condenser fan status, economizer valve status, evaporation fan speed status, current in different phases, suction modulation valve opening, etc. The refrigeration system status may include actuation values or actuation states. Furthermore, any alarms triggered by the refrigeration system 603 may be communicated to the refrigeration system control unit 611 for logging. Likewise, the refrigeration system control unit 611 may raise and log an alarm in dependence of the refrigeration system parameter data obtained from the refrigeration system 603.

Communication between the refrigeration system 603 and the refrigeration system control unit 611 is performed via a wired or a wireless connection. The refrigeration system control unit 611 controls the components of the refrigeration system e.g. the fans 610 and 605, the heater 608 and the compressor 607 as it is known in the prior art.

The refrigeration system control unit 611 may comprise or be in communication with a reefer container communication unit 612 for communicating with a local communication unit 203. Thus, refrigeration system parameter data and/or alarms of the refrigeration system 603 may be communicated via refrigeration system control unit 611 to the local communication unit 203. Via local communication unit 203, refrigeration system parameter data and/or one or more alarms as acquired during operation of the refrigeration system may thus be communicated to a remote server communication unit from one or more reefer containers. The local communication unit 203 may for example be a communication unit positioned on board a transportation means, such as a container vessel, a freight train, a truck, and may communicate with one or more reefer containers on board the transportation means, such as particularly on board a container vessel.

In some embodiments the refrigeration system control unit 611 is configured as a data acquisition system that interfaces with sensors, valves and circuits of the refrigeration system 603 and which furthermore interfaces with a communication unit, such as a modem.

In some embodiments, the container communication unit 612 is configured for communicating with the local communication unit 203 using a short-range communication protocol, including a local area network, such as WLAN, Bluetooth, a local telecommunication network, such as a local GSM network, a local ZigBee network, or any other communication standard configured to facilitate short range communication. Communication between the local communication unit 203 and the server communication unit is typically done using a long-range communication protocol, including satellite communication, telecommunication protocols, such as GSM communication protocols, etc. Typically, such long-range communication protocols have a higher power consumption and are typically, engaged for communication in shorter time-intervals to reduce power consumption.

Figure 7:
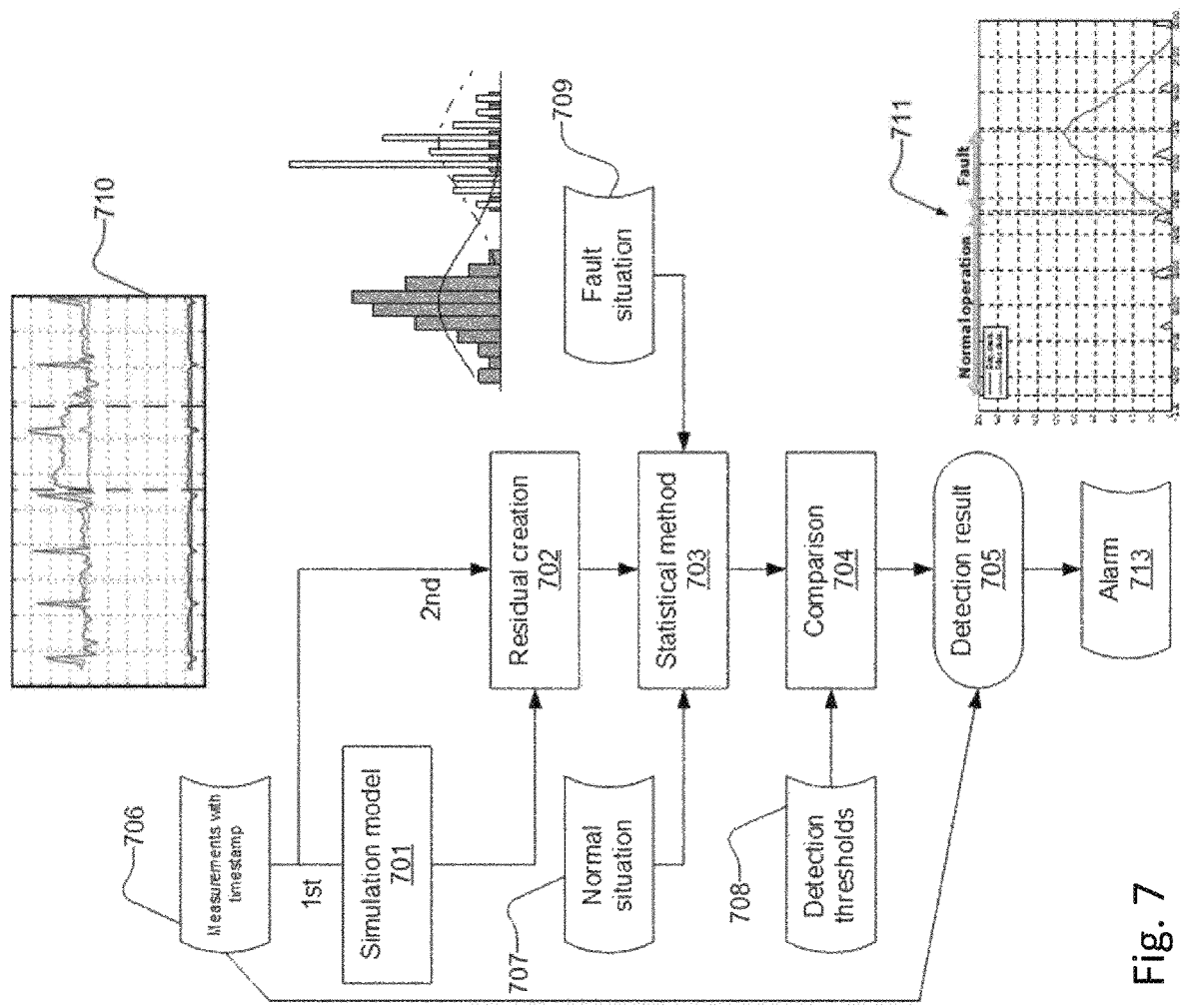
FIG. 7 is a flow chart of an analysis according to an embodiment.

FIG. 7 shows an exemplified analysis of the refrigeration system parameter data. The exemplified analysis is based on a simulation model. In FIG. 7, a flowchart of a method of analysing refrigeration system parameter data 706 is shown.

The method operates on received refrigeration system parameter data 706 that comprises a first set of parameter data and a second set of parameter data with a respective first and second sequence of measurement values. As will be described in more detail below, the first and second sequence of measurement values comprise values measured either by sensors coupled to a communication unit via a control computer of the reefer container or sensors coupled directly to a communication unit.

The simulation model 701 receives the first set of parameter data as its input and outputs simulated values that are estimates of the second set of parameter data.

The output from the simulation model (i.e. the estimates of the second set of parameter data) and the second set of parameter data (i.e. the measured values) are input to a step 702 of computing residuals. The residuals are the differences between the values of the second set of parameter data and the values of the estimates of the second set of parameter data. The residuals comprise information about how well the estimates fit the measured values.

The simulation model 701 is configured to estimate the second set of parameter data under the condition that the refrigeration system operates in a normal operating condition. That is, the refrigeration system is free from significant performance degrading faults or impairment. Under this condition, the residuals may indicate that the estimates fit the measured values well.

When a deviation from the condition that the refrigeration system operates in a normal operating condition occurs, e.g. when a performance degrading fault occurs, the residuals indicate that the estimates fit the measured values less than well. Graph 710 shows four sequences of values as a function of time. At the bottommost of the graph 710 is shown a sequence of measured values of the second set of parameter data (e.g. a measured suction pressure $P_{suction}$ in a refrigeration circuit of the reefer container) and an estimate thereof as output from the simulation model. At the topmost, is shown a sequence of measured values of the second set of parameter data (e.g. a measured discharge pressure $P_{discharge}$ in the refrigeration system) and an estimate thereof as output from the simulation model. As can be seen in the time interval between the two vertical dashed lines, the estimate doesn't fit as well as it does at other times. This will show clearly in the residuals computed in step 702. The residuals are computed according to conventional methods known in the art.

The parameter data may result from measurements of ambient conditions and systems conditions. The ambient conditions may comprise the ambient temperature, ambient humidity, gas concentration (e.g. $O_2$ concentration), volume of fresh-air intake, and/or other ambient conditions. Ambient should be understood in the sense relative to the enclosure defined by the reefer container. The system conditions may comprise a supply air temperature, a return air temperature (see FIG. 6), a cargo temperature, a suction pressure in a refrigeration system, a discharge pressure in the refrigeration system and/or other system conditions.

The parameter data may also comprise parameters that distinguish different types of reefer containers from one and another (e.g. a parameter that distinguish one type of refrigeration system from another and/or a parameter that distinguish one type of thermal insulation of a container from another).

Typically such values are defined in a database of reefer containers. The database may be a part of a so-called booking system or reefer container resource system for booking a container for a particular trip or be part of a so-called container management system.

The parameter data may also comprise parameters in the form of cargo descriptor values that may specify thermal properties of the cargo. Cargo descriptor values may comprise values for specific heat of the cargo, respiratory heat of the cargo, commodity type, weight, volume and/or other cargo descriptor values. Such parameter data are also designated initial conditions.

The parameter data may also comprise parameters in the form of settings that define desired target values or ranges for a predefined physical property that the refrigeration system control unit is configured to reach and maintain. The predefined physical property may be a desired return air temperature and/or a humidity level and/or a concentration of gas and/or another property. Conventionally, such a setting is denoted a set-point, e.g. a set-point temperature.

In general the parameters in first set of parameter data and the parameters in the second set of parameter data are selected from the above-mentioned parameters in a mutually exclusive manner and such that the simulation model outputs estimates of parameter data in the second set such that respective residuals can be computed. In some embodiments the parameters in the first set of parameter data are selected as ambient conditions, and the second set of parameter data are selected as system conditions.

The simulation model may be a deterministic model based on first principles of thermodynamics or a statistical model. The simulation model implements expressions that express relations between parameters input to the model and its output. The simulation model may operate on values (also denoted samples) at a most current time instance and/or on values or samples one or more time instances back in time.

In an embodiment the simulation model has a first mode, which is a default mode and a second selectable mode. In the second mode, the simulation model operates on values at one or two sample point(s) in time and disregards operations on previous and future values. The second mode is also denoted a static model. The operations on previous values may comprise computation of derivatives with respect to time. In the first mode the simulation model operates on present and previous values comprising computing of derivatives with respect to time. The first mode is also designated a differential equation model or a transient model and is selected when the simulation model operates on data in a transient phase while the system operates to approach some target value e.g. a set point temperature. The second mode operates on two or more samples back in time. The second mode is selected when the system has settled around the target value. Once a range about a set-point is reached, after a transient phase, the second model is selected and output values there from computed. Once output values from the first and second model agree, the first model is deselected in the sense that computation of output values is stopped. This approach gives better estimation results and saves computational resources/power.

A statistical method 703 is applied to process the residuals computed in step 702 and to compute an indicator value as a function of residual values. The indicator value may change its value over time and remain within a predefined range while the estimates output form the simulation model fit well with the measured values, whereas when the measurement values are significantly deviating from the estimates, the indicator value runs outside the predefined range.

The statistical method 703 operates on:
the residuals computed in step 702,
parameters 707 representing an expected distribution of the residuals in a normal operating condition, and
parameters 709, representing an expected distribution of the residuals in a fault condition.

This is illustrated in the graph 712, wherein the abscissa represents the magnitude of the residuals, and the ordinate represents the frequency of the residuals. The left hand side solid line represents the expected distribution of the residuals in a normal operating condition and the right hand side dashed line represents the expected distribution of the residuals in a faulty operating condition. The frequency of the residuals over a time period is represented as bars. For illustrative purposes the frequency of the residuals in a normal situation is shown by filled bars and the frequency of the residuals in a fault situation is shown by non-filled bars. It can be seen that residuals in a fault situation deviates and results in larger residuals. It can also be seen that residuals occasionally may be quite large even in a normal situation, cf. the filled bars to the right in the graph. The distribution of the residuals in normal and/or fault mode is estimated from historical observations or historical parameter data under normal and faulty conditions.

The statistical method operates on the residuals computed in step 702 and the parameters 707 and 709 as described below, wherein a residual value is designated $x_m$ with subscript m designating a time index. The two functions $p_{Fault}(x_m)$ and $p_{Normal}(x_m)$ express the likelihood value for a given residual value $x_m$ given that the residual stems from a fault condition or a normal condition, respectively. For any residual value $x_m$ the value of $p_{Fault}(x_m)$ and $p_{Normal}(x_m)$ is computed. The ratio of the likelihood that the residual value stems from fault to the likelihood that the residual value stems from normal situation is computed. A high ratio indicates that a fault is more likely than a normal situation and vice versa.

The logarithmic value of the ratio is then computed at or for each time instance $x_m$. Thereby a value that is symmetric about the value zero is achieved; the logarithmic value of the ratio 1/1=0; the ratio and symmetrically.

The indicator value is computed by accumulating the computed logarithmic values over multiple time instances m. The accumulation starts at time instance j and ends at time instance M (capital M). The time instance M may represent a present point in time and time instance j, wherefrom the accumulation starts may represent a point in time when the statistical method was initialised e.g. by detection of a new trip for the reefer container. In this way non-fault conditions which may appear like fault conditions e.g. during loading of the reefer container or during a transient phase following shortly thereafter can be disregarded in the computation of the indicator value.

In a formal representation the statistical model is expressed below:

$$S_m(j) = \sum_{m=j}^{M} \ln\left(\frac{p_{Fault}(x_{m'})}{p_{Normal}(x_{m'})}\right)$$

Wherein $S_m(j)$ is the indicator value as a function of indexes m and j. The variables and functions are explained in the above.

In some embodiments, negative values of $S_m(j)$ are discounted in the event the probability of a normal situation prevails over the probability of fault situation, such that:

$$S_m(j) = \begin{cases} S_m(j) > 0: & S_m(j) \\ S_m(j) \le 0: & 0 \end{cases}$$

Thereby the indicator value does not run away over long periods of normal operation. This computation is also denoted a recursive likelihood ratio method.

The indicator value is subject to comparison against a detection threshold value 708 in step 704. The level of the detection threshold may be decided on by a heuristic of possible or most likely faults. The level of the detection threshold may be adapted such that the threshold is not exceeded when shorter periods of fault-like residuals occur i.e. the indicator value increases over multiple time instances. However, unless such shorter periods are followed by periods where the indicator value decreases, the threshold may be exceeded after some time.

It should be emphasized that the simulation model 701 may output estimates of multiple measurements e.g. 1) supply temperature, 2) return temperature, 3) suction pressure and 4) discharge pressure and other parameter data. Therefore, respective residuals are computed that can be processed individually by the statistical method to give respective indicator values. In some embodiments two or more residuals e.g. suction pressure and discharge pressure residuals are combined e.g. by addition or linear combination into a combined residual. Such a combined residual may be input to the statistical model. Thereby it is possible to tune the residual computation to have a desired sensitivity to particular fault conditions and to reduce the probability of erroneous fault detections.

The graph 711 illustrates how a first and second indicator value depicted along the ordinate axis may develop over time instances depicted along the abscissa axis. A first indicator value develops over time with peaks, but it reverts to zero or close to zero after each peak. A second indicator value develops over time with lower peaks, but it starts to increase at a point in time and rises far above the smaller peaks. A threshold above the smaller peaks may capture this so that an alarm can be raised. When the fault is identified by the alarm signal and the cause has been removed (e.g. by mending the refrigeration system or a component thereof) the indicator value decreases again since the probability that the residuals stem from a normal situation predominates.

In step 705 a result of evaluating the indicator value is determined. The result may be that an alarm 713 is issued in case the threshold is exceeded. The alarm 713 may indicate the time instance at which the threshold was exceeded. Step 705 may comprise evaluation of multiple indicator values. The evaluation may be individually performed with respective individual detection thresholds 708 or the evaluation may involve the combination of the multiple indicator values e.g. by a weighted combination.

The alarm may comprise or be associated with values of a sequence of measurement values measured by sensors coupled to the control computer. The values may serve to document how the measurement values developed before and optionally after the alarm was issued. The values may comprise all or substantially all values from the respective trip of the respective reefer container or it may comprise a shorter trail of values leading to the alarm. In case of multiple indicator values, the alarm may indicate the indicator value exceeding its respective threshold.

Also, in case an alarm is not issued in respect of a trip, a report may be provided with values of a sequence of measurement values measured by sensors coupled to the control computer or other hardware device to document that the goods or produce was transported in a reefer container without faults.

Although particular embodiments have been shown and described, it will be understood that it is not intended to limit the claimed inventions to the preferred embodiments, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. A control system for automatic controlling reefer container resources, the system comprising:
 a plurality of reefer containers, each reefer container being subjected to release requirements including physical pre-trip inspection, each reefer container comprising:
  a refrigeration system configured to control a climate of an interior cargo compartment of the reefer container, the refrigeration system comprising a refrigeration circuit, including at least a compressor configured to compress a refrigerant, a cooling space, and sensors,
  wherein the sensors are configured to measure refrigeration system readings including at least one of ambient air temperature, supply air temperature, return air temperature, refrigerant suction pressure, refrigerant discharge pressure, set-point values, temperature set-point, humidity set point, fresh air ventilation values, refrigerant temperature, discharge temperature, or suction temperature,
  wherein the refrigeration system is configured to transmit refrigeration system parameter data based on refrigeration system readings, and
  a refrigeration system controller configured to receive the refrigeration system parameter data and to transmit the refrigeration system parameter data; and
 a remote server computer configured to:
  obtain the refrigeration system parameter data as acquired during operation of the refrigeration system from at least one reefer container via a server communication unit,
  analyze the refrigeration system parameter data to estimate a condition of the reefer container, including determining whether an alarm has been issued, or whether the estimated reefer container condition indicates that the refrigeration system requires maintenance or further testing, wherein the condition of the reefer container comprises a physical pre-trip inspection determination, and
  transmit the physical pre-trip inspection determination to a reefer container resource unit to allocate the reefer container based on the reefer container condition,
 wherein the physical pre-trip inspection determination is negative when the remote server computer determines that a physical pre-trip inspection must be performed and the physical pre-trip inspection determination is positive when the remote server computer determines that a physical pre-trip inspection can be skipped.

2. A system according to claim 1, wherein the refrigeration system controller is configured to issue one or more alarms, and wherein the one or more alarms are transmitted via the communication unit to the server.

3. A system according to claim 1, wherein the reefer container is an intermodal reefer container, the intermodal reefer container being transported during operation, while the remote server computer is provided remotely from the intermodal reefer container at a predetermined location.

4. A system according to claim 1, wherein the refrigeration system parameter data are provided to the server computer via the server communication unit and a reefer container communication unit.

5. A control system for controlling reefer container resources, the system comprising:
 a plurality of reefer containers, each reefer container being subjected to release requirements including physical pre-trip inspection, each reefer container comprising:
  a refrigeration system configured to control a climate of an interior cargo compartment of the reefer container, and
  a refrigeration system controller configured to provide refrigeration system parameter data; and
 a remote server computer being configured to:
  obtain the refrigeration system parameter data as acquired during operation of the refrigeration system from at least one reefer container via a server communication unit,
  analyze the refrigeration system parameter data to estimate a condition of the reefer container, the condition of the reefer container comprising a physical pre-trip inspection determination, and
  provide the reefer container condition including the physical pre-trip inspection determination to a reefer container resource control unit to allocate the reefer container based on the reefer container condition,
 wherein the physical pre-trip inspection determination is negative when the remote server computer determines that a physical pre-trip inspection must be performed and the physical pre-trip inspection determination is positive when the remote server computer determines that a physical pre-trip inspection can be skipped.

6. A method of automatically controlling reefer container resources in a reefer container system comprising a remote server computer in communication with a plurality of reefer containers, each reefer container comprising a refrigeration system configured to control a climate of an interior cargo compartment of the reefer container, the refrigeration system comprising a refrigeration circuit, including at least a compressor configured to compress a refrigerant, a cooling space, and sensors, each reefer container being subjected to release requirements including physical pre-trip inspection, the method comprising, at the refrigeration system:
measuring by the sensors, refrigeration system readings including at least one of ambient air temperature, supply air temperature, return air temperature, refrigerant suction pressure, refrigerant discharge pressure, set-point values, temperature set-point, humidity set point, fresh air ventilation values, refrigerant temperature, discharge temperature, or suction temperature, and
transmitting, from the refrigeration system, refrigeration system parameter data based on refrigeration system readings,
the method further comprising, at the remote server computer:
obtaining refrigeration system parameter data acquired during operation of the refrigeration system from at least one reefer container via a server communication unit,
analyzing the refrigeration system parameter data to estimate a reefer container condition, including making a physical pre-trip inspection determination to determine whether a physical pre-trip inspection can be skipped, and further including determining whether an alarm has been issued, or whether the estimated reefer container condition of the refrigeration system indicates that the refrigeration system requires maintenance or further testing, wherein the condition of the reefer container comprises the physical pre-trip inspection determination, and
transmitting the physical pre-trip inspection determination to a reefer container resource unit, and
the method further comprising receiving the reefer container condition including the physical pre-trip inspection determination at the reefer container resource control unit to automatically allocate the reefer container based on the reefer container condition.

7. A method of controlling reefer container resources in a reefer container system comprising a remote server computer in communication with a plurality of reefer containers, each reefer container comprising a refrigeration system configured to control a climate of an interior cargo compartment of the reefer container, each reefer container being subjected to release requirements including physical pre-trip inspection, the method comprising, at the remote server computer:
obtaining refrigeration system parameter data acquired during operation of the refrigeration system from at least one reefer container via a server communication unit,
analyzing the refrigeration system parameter data to estimate a reefer container condition, including making a physical pre-trip inspection determination to determine whether a physical pre-trip inspection can be skipped, the condition of the reefer container comprising the physical pre-trip inspection determination, and
providing the reefer container condition including the physical pre-trip inspection determination to a reefer container resource control unit to allocate the reefer container based on the reefer container condition.

8. A method according to claim 7, comprising making a negative physical pre-trip inspection determination in response to an alarm having been issued, or comprising making a negative physical pre-trip inspection determination in response to the estimated reefer container condition of the refrigeration system indicating that the refrigeration system requires maintenance or further testing.

9. A method according to claim 7, wherein the analyzing is triggered by one or more reefer container events.

10. A method according to claim 9, wherein parameter data obtained comprises a plurality of parameter data acquired at a plurality of time instances during operation of the refrigeration system, the plurality of parameter data comprises at least first parameter data acquired at a first time and second parameter data acquired at a second time during operation of the refrigeration system.

11. A method according to claim 10, wherein the first parameter data comprises parameter data which are not controllable by a refrigeration system control unit and wherein the second parameter data comprises refrigeration system parameter data which values are affected by the performance of the refrigeration system.

12. A method according to claim 10, wherein the plurality of time instances are distributed over a period of time, the period of time being at least 50% of a loaded reefer container transport time.

13. A method according to claim 7, wherein the reefer container is an intermodal reefer container, the intermodal reefer container being transported during operation, while the remote server computer is provided remotely from the intermodal reefer container at a predetermined location.

14. A method according to claim 7, wherein the refrigeration system parameter data are acquired during operation of the refrigeration system when the at least one reefer container is loaded.

15. A method according to claim 7, wherein the refrigeration system parameter data comprises refrigeration system readings including supply air temperature, return air temperature, suction pressure, discharge pressure and set-points.

16. A method according to claim 7, wherein the refrigeration system parameter data are provided to the remote server computer via the server communication unit and a reefer container communication unit.

17. A method according to claim 7, wherein the remote server computer obtains one or more alarms if a fault at the refrigeration system is detected.

18. A method according claim 17, wherein the analyzing to determine the condition of the reefer container, comprises analyzing the refrigeration system parameter data, the one or more alarms, reefer booking information and/or historic reefer condition information.

19. A method according to claim 7, wherein the remote server computer receives reefer booking information, the reefer booking information comprising cargo type information and/or cargo properties, the cargo properties including cargo thermo-dynamic properties.

20. A method according to claim 19, wherein the cargo properties comprise cargo transport temperature, cargo weight, cargo respiration heat and/or cargo heat capacity.

21. A method according to claim 7, wherein the remote server computer receives historic reefer condition information.

22. A method according to claim 7, further comprising evaluating the refrigeration system parameter data as received at the remote server computer and incrementing a certainty indicator based on the evaluation of the refrigeration system parameter data.

23. A method according to claim 22, wherein the evaluation of the refrigeration system parameter data comprises estimating a load of the refrigeration system at the time of data acquisition, and incrementing the certainty indicator with the estimated load of the refrigeration system.

24. A method according to claim 23, wherein the determined condition of the reefer container is a trusted condition if the certainty indicator is above a predetermined threshold.

25. A method according to claim 23, further comprising issuing an alarm while the certainty indicator is below a predetermined threshold.

26. A method according to claim 7, wherein the analyzing is triggered in dependence of specific reefer container events including when the reefer container changes status to discharged, gate-out or gate-in.

27. A method according to claim 7, wherein a physical pre-trip inspection for the reefer container is scheduled if an alarm is issued.

28. A method according to claim 7, wherein the refrigeration system parameter data are measured at the refrigeration system during a booked trip and wherein the refrigeration system parameter data are measured while cargo is provided in the cargo compartment.

29. A method according to claim 7, wherein the analyzing to estimate the condition of the reefer container includes issuing an alarm if the determined condition of the reefer container is negative.

30. A method according to claim 7, comprising:
obtaining, via the server communication unit, refrigeration system parameter data acquired during operation of the refrigeration system of each of the plurality of reefer containers;
analyzing the refrigeration system parameter data to estimate a reefer container condition for each of the plurality of reefer containers, the condition of each reefer container comprising a physical pre-trip inspection determination; and
providing the reefer container condition, including the corresponding physical pre-trip inspection determination, for each of the plurality of reefer containers, to the reefer container resource control unit to allocate each of the plurality of reefer containers, based on their respective reefer container conditions,
wherein, for at least one reefer container, the physical pre-trip inspection determination is positive, and, for each of a remainder of the plurality of reefer containers, the physical pre-trip inspection determination is negative.

* * * * *